(12) United States Patent
Studerus et al.

(10) Patent No.: US 9,599,458 B2
(45) Date of Patent: Mar. 21, 2017

(54) DISTANCE DETERMINATION OF IMAGES WITH REFERENCE OBJECT

(71) Applicant: Kaba AG, Wetzikon (CH)

(72) Inventors: Paul Studerus, Oberweningen (CH); Justin N. M. Pinkney, Welwyn Garden (GB)

(73) Assignee: KABA AG, Wetzikon (CH)

( * ) Notice: Subject to any disclaimer, the term of this patent is extended or adjusted under 35 U.S.C. 154(b) by 0 days.

(21) Appl. No.: 14/561,441

(22) Filed: Dec. 5, 2014

(65) Prior Publication Data

US 2015/0169996 A1    Jun. 18, 2015

(30) Foreign Application Priority Data

Dec. 18, 2013 (CH) .................................. 2100/13

(51) Int. Cl.
| | | |
|---|---|---|
| *G01B 11/14* | (2006.01) | |
| *G06T 7/60* | (2006.01) | |
| *F16G 11/14* | (2006.01) | |
| *E05B 17/06* | (2006.01) | |
| *E04F 21/00* | (2006.01) | |
| *F16G 11/02* | (2006.01) | |

(52) U.S. Cl.
CPC .............. *G01B 11/14* (2013.01); *E04F 21/00* (2013.01); *E05B 17/06* (2013.01); *F16G 11/02* (2013.01); *F16G 11/146* (2013.01); *G06T 7/60* (2013.01); *G06T 2207/10016* (2013.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 4,381,152 A | * | 4/1983 | Riech ..................... | G01B 11/02 250/559.24 |
| 4,899,061 A | * | 2/1990 | Van Hoek ............ | G01B 11/024 250/559.08 |

(Continued)

FOREIGN PATENT DOCUMENTS

EP    2 511 650    10/2012

OTHER PUBLICATIONS

Matrix(Mathematics), Wikipedia, Screenshot using WayBackMachine from Dec. 4, 2003, Accessed on Apr. 19, 2013.*

*Primary Examiner* — Jason Heidemann
*Assistant Examiner* — Brian Shin
(74) *Attorney, Agent, or Firm* — Rankin, Hill & Clark LLP

(57) ABSTRACT

A method for determining a distance between two spatial points, thus between a first point and a second point, includes recording a first picture from a first viewing point, wherein the first picture includes a reference object and the first point, recording a second picture for a second viewing point, wherein the second picture includes the reference object and the second point and wherein the second viewing point is different than the first viewing point and finally determining the distance between the first point and the second point from picture data of the first picture and picture data of the second picture using a known dimension of the reference object. Thereby, the first point and/or the second point can be arranged outside a plane encompassing the reference object.

22 Claims, 4 Drawing Sheets

(56) References Cited

U.S. PATENT DOCUMENTS

| | | | | |
|---|---|---|---|---|
| 6,094,215 A | * | 7/2000 | Sundahl | G03B 35/02 |
| | | | | 348/155 |
| 2007/0041800 A1 | * | 2/2007 | Santos | B23B 47/287 |
| | | | | 408/115 R |
| 2010/0013909 A1 | * | 1/2010 | Zhang | G06T 7/2086 |
| | | | | 348/50 |
| 2012/0169868 A1 | * | 7/2012 | Bae | G01B 11/024 |
| | | | | 348/135 |
| 2013/0201301 A1 | * | 8/2013 | Huang | H04N 13/0221 |
| | | | | 348/50 |
| 2014/0300722 A1 | * | 10/2014 | Garcia | G06T 7/602 |
| | | | | 348/77 |

* cited by examiner

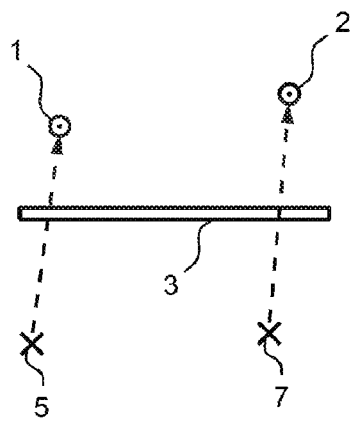
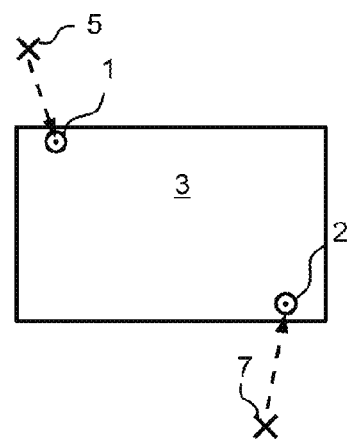
Fig. 1
Fig. 2
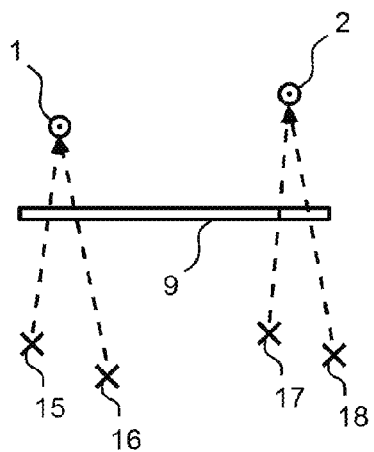
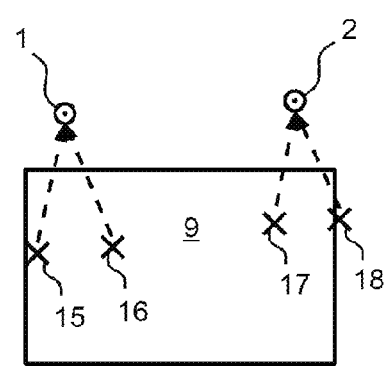
Fig. 3
Fig. 4
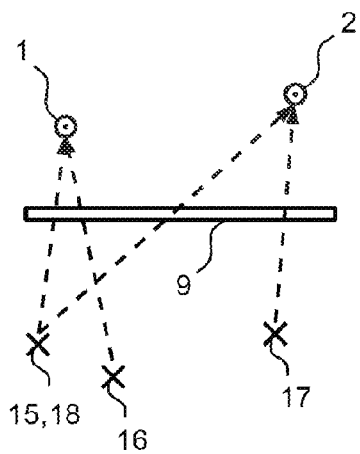
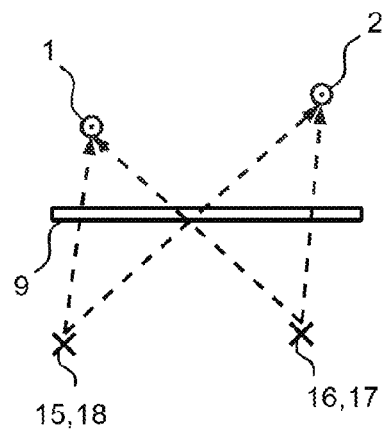
Fig. 5
Fig. 6

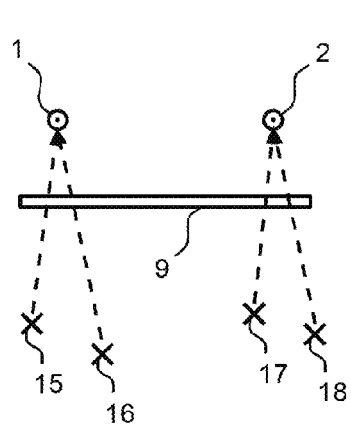
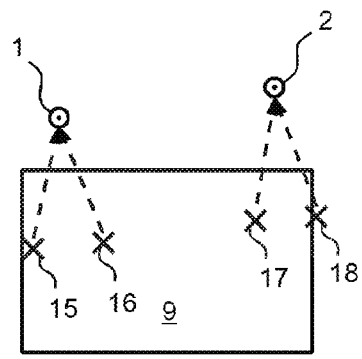
Fig. 7
Fig. 8
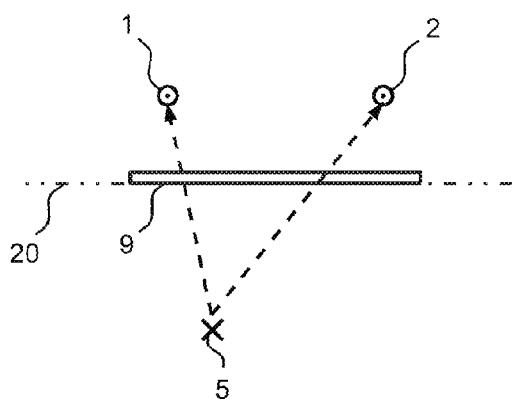
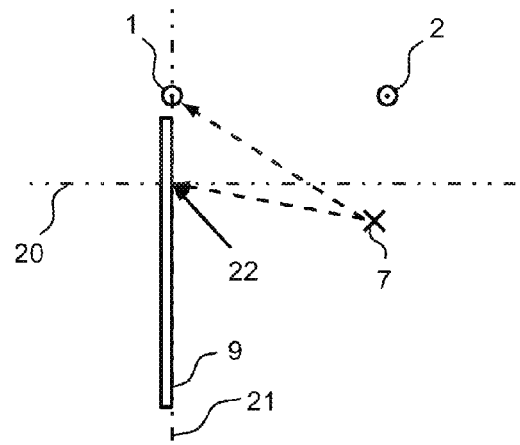
Fig. 9
Fig. 10

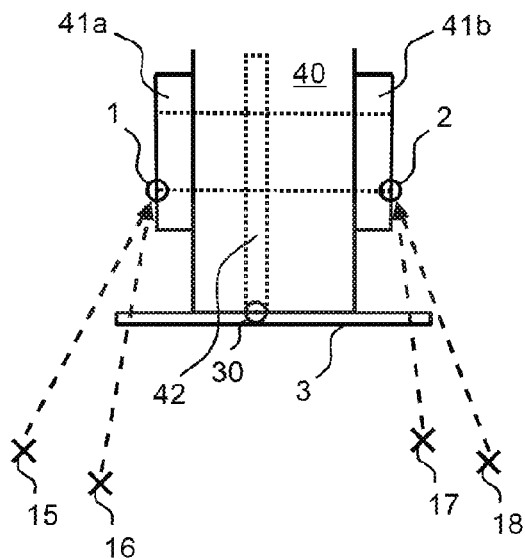
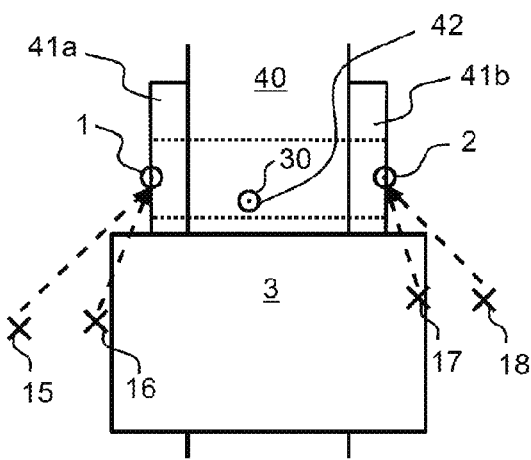
Fig. 11　　　　　　　　Fig. 12
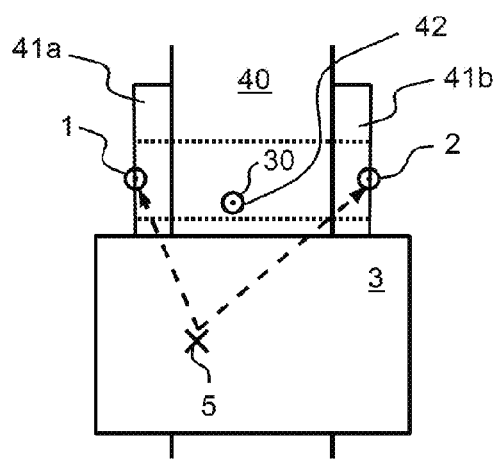
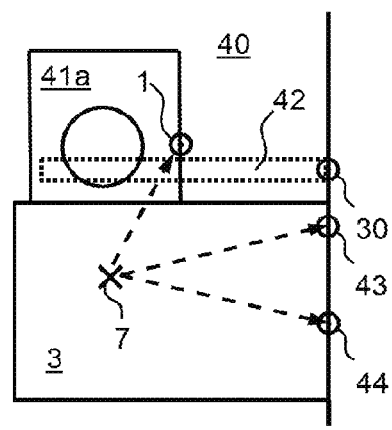
Fig. 13　　　　　　　　Fig. 14

DISTANCE DETERMINATION OF IMAGES WITH REFERENCE OBJECT

BACKGROUND OF THE INVENTION

Field of the Invention

The invention relates to the field of methods for determining a distance between two spatial points by way of recording and evaluating pictures that include a reference object. The invention moreover relates to computer programs, which include software for the determining of the distance, which is described above, and to electronic apparatuses.

Description of Related Art

Such a method, for example, is known from EP 2 511 650 A1, which describes a method for detecting a size of an installation space for a door or a window. Thereby, a calibration element is arranged at an edge of the installation space, and a picture encompassing the calibration element and the installation space is recorded. A size ratio of the installation space to the calibration element is determined from an evaluation of the picture. This size ratio and the dimensions of the calibration element then permit a determining of the effective size, i.e. the real dimensions of the installation space.

A disadvantage of the described method from the state of the art lies in the fact that this method can determine a distance only between points that are encompassed by the same picture. Thereby, apart from the measurement points, the calibration element (also indicated as a reference object) must yet also be simultaneously encompassed by the picture. This necessitates the measurement points as well as the reference object being simultaneously visible, seen from a viewing point of a recording device taking the picture.

A further disadvantage of the described method from the state of the art lies in the fact that the reference object as well as two measurement points must be spatially arranged in the same plane. If the reference object and the two measurement points do not lie in the same plane, then the determining of the distance between the two measurements points becomes inaccurate. The method from the state of the art thus does not carry out a depth correction, and thus a determining of a distance of measurement points lying outside a plane encompassing the reference object is subject to error and is inaccurate on account of this. However, an arrangement of the reference object in a plane encompassing the two measurement points is difficult or not possible at all in many situations.

An arrangement of the reference object in a plane which encompasses both measurement points is particularly difficult or even impossible, in particular on measuring three-dimensional objects. This is the case, for example, if a line connecting the two measurement points runs through the three-dimensional object and not on its surface. In particular, a determining of the distance between the two measurement points at best is cumbersome or not even possible, if at least one of the two measurement points is covered, thus is arranged roughly behind an undercut, a projecting edge or a collar.

Moreover, the described method from the state of the art has the disadvantage that all measurement points must lie in the same plane, in which more the reference object must also lie, for an accurate measurement of distances between more than two measurement points. Thus, it is not possible to measure a distance between three measurement points without errors, if the reference object does not also lie in this plane. As the case may be, a separate picture must be taken and a separate distance measurement carried out, for each individual measurement point pair, with the method from the state of the art. This is cumbersome, for instance when determining distances between several points of three-dimensional objects. This is particularly disadvantageous if the measurement points are only difficulty accessible, such as with inner structures of three-dimensional objects or with assembled parts.

A determining of a distance between a first measurement point and a second measurement point and which is different from zero is also not possible if the second measurement point is not visible, but instead a plane running through the second measurement point with further measurement points lying in this plane is visible.

This, for example, is disadvantageous if characteristic dimensions of a lock cylinder of a door lock are to be determined. The characteristic dimensions of a lock cylinder are distances in each case between an outer side of armatures of a door lock and a position of a forend screw in the lock cylinder. Moreover, a distance indicated as a backset can also be of interest. The backset is the distance between the face side of the door and a middle axis of the lock cylinder or a middle axis of an opening in the armatures of the door lock, said opening receiving the lock cylinder. The characteristic dimensions and, as the case may be, also the backset are important, for example, on equipping doors that already have door locks, but do not yet have a lock cylinder, for the first time. A determining of the characteristics dimensions of the lock cylinder and, as the case may be, of the backset are also of interest with repairs and/or the replacement of lock cylinders.

The face side of the door is thereby indicated as a side of the door, through which a door latch is moved on closing the door lock. The forend screw is a screw which runs from the face side of the door, into the door and through the lock cylinder and by way of this fastens the lock cylinder in the door. Thus the position where the forend screw is located inside the lock cylinder is not visible from the outside, but is important for determining the characteristic dimensions of the lock cylinder. The head of the forend screw in the face side of the door, or the opening in the face side of the door that is envisaged for this however is visible, but does not lie in the same plane as the openings for the lock cylinder in the fittings. A determining of these distances is only possible with a large effort and/or with a large inaccuracy with the described method from the state of the art.

SUMMARY OF THE INVENTION

It is therefore the object of the invention, to create a method of the initially mentioned type, which at least partly overcomes at least one of the disadvantages mentioned above.

This object is achieved by a method according to the present invention.

The method according to the invention for determining a distance between two spatial points, thus between a first point and a second point, include the following points:

recording a first picture from a first viewing point, wherein the first picture includes a reference object and the first point, recording a second picture from a second viewing point, wherein the second picture includes a reference object and the second point, and wherein the second viewing point differs from the first viewing point, determining the distance between the first point and the second point from picture data of the first picture and picture data of the second picture, while using a known dimension of the reference object.

Thereby, first point is indicted as a first spatial point, and a second point as a second spatial point. A viewing point indicates a point, from which a picture is recorded. A picture that is taken from a viewing point has a specific perspective. A recording of pictures from different viewing points results in pictures with different perspectives.

A picture is thereby a two-dimensional optical reproduction of reality. A picture displays an optical reproduction of the reality from a perspective of a recording device that records this picture. This optical reproduction thus shows a section of a view from the perspective of the recording device and from the viewing point of the recording device at a point in time of the recording. Thereby, the picture can be chemically and/or electronically stored.

A picture thereby includes picture data which includes the two-dimensional optical reproduction of the reality. "Spatial position" of an object indicates as a three-dimensional arrangement of the object in space and in particular in real space. In contrast to this, a "position of an object in a picture" indicates a two-dimensional position of the object within the picture plane of the picture, thus a two-dimensional position of the picture data in the picture, said picture data representing the object.

A picture and its picture data are influenced by the viewing point, the perspective and further factors, such as, for example, by optics of a recording device and/or storage/memory methods of the picture. For example, a picture can be influenced by a focal width of an optical system of the recording device. In particular, a focal length of a lens of the recording device influences the picture. A pixel size and pixel distribution of a picture sensor of the recording device can also influence the picture. These factors with the exception of the viewing point and the perspective can optionally be applied on determining the distance between the first point and the second point and additionally increase the accuracy of the method.

A reference object is indicated as an object which has known dimensions. The reference object serves as a reference for determining the distance, thus for a length measurement. The reference object can, for example, have known dimensions. Optionally, the reference object can additionally have a known shape.

In particular, at least two pictures can be simultaneously recorded in the mentioned method.

For example, a recording device that includes two separate cameras, for instance so-called 3D cameras, can be used for recording the pictures. Such recording devices thereby can be used for the simultaneous recording to two pictures and/or for recording only a single picture, at a certain point in time. The same analogously applies to recording devices with more than two separate cameras.

The reference object can be designed as a freely movable object. A reference object, for example, is designed in a flat manner. In particular, a reference object is a plane, flat object such as a card or a disc. A reference object, for example, can be an object of standardised dimensions, wherein standardised dimensions of an international standard (such as the ISO standard) are sufficient.

The reference object, for example, can also be designed as a part of a three-dimensional object, on which the first point and/or the second point are arranged. For example, a head of the forend screw can serve as a reference object in the above-described case of a door lock, if the dimensions of this head are known.

A picture only encompasses a two-dimensional view of the reference object. In particular, the reference object can have a reference surface that can be used as a reference for determining the distance between the first point and the second point. The reference surface has known dimensions and optionally additionally also a known shape. In particular, the reference surface can thereby be plane. Basically, the described methods that use a reference object can also be used with a reference surface and vice versa.

A sequence of the recording is of no relevance on recording the pictures in the mentioned methods. Unless there is a change of the spatial position of the reference object between the recording of the pictures, the sequence of the recording has no influence on the pictures. A certain sequence can configure the method in a rapidly and efficiently usable manner.

With the method mentioned above, a distance between the first point and the second point can be determined, wherein the first point is encompassed by a first picture and the second point is encompassed by a second picture, which is different to the first picture. The first picture thereby can optionally be free of picture data of the second point. The second picture can optionally be free of picture data of the first point. The distance between the first point and the second point can be determined by way of an evaluation of the picture data of the first and of the second picture, while using the known dimensions of the reference object.

An advantage of this method is that a combination of at least one piece of information from the picture data of the first picture and of at least one piece of information of the picture data of the second picture permits the evaluation of the distance between the first point and the second point, even if the first point and the second point are not on the same picture. This is an advantage compared to the method from the state of the art, in which the first point and the second point together with the reference object necessarily need to be encompassed by the same picture. The method can be applied and used in significantly more varied and general manner due to the absence of this condition. The first picture can optionally also encompass the second point and/or the second picture also encompass the first point.

It is also advantageous that the first picture and the second picture are recorded from different viewing points. This permits a comprehensive and flexible application of this method for determining the distance between two points, since the first point only needs to be visible from the first viewing point and the second point only from the second viewing point. In contrast, in the state of the art, the first point as well as the second point must be visible from a single viewing point. Often, not all spatial points are visible from a single viewing point, or such a viewing point is only difficultly accessible or even not at all. The method for determining distances between measurement points that are not accessible for methods according to the state of the art can be used by way of a combination of picture data of pictures of different viewing points.

A combination of at least one piece of information from the picture data of the first picture and of at least one piece of information from the picture data of the second picture permits the determining of the distance between the first point and the second point, for example also if the reference object or a reference surface is arranged in a plane that forms an empty intersection with the first point and/or the second point (thus if the first point and/or the second point lie outside this plane). The recording of two pictures, thus of the first picture and of the second picture, instead of recording only one picture therefore removes the precondition given by the state of the art, that the first point, second point and reference object must lie in the same plane, in order to permit an accurate evaluation of the distance between the first point and second point. The method can be applied and used in a more comprehensive manner by way of this.

This combining of picture data of the first picture and of the second picture also permits an evaluation of distances between measurement points that are arranged in space in a relatively complicated manner and/or of non-visible measurement points, for instance for the case of a door lock as described above.

Yet further information can be used for determining the distance between the first point and the second point. For example, information on a spatial position of the reference object relative to the first point on the first picture in comparison to the spatial position of the reference object relative to the second point on the second picture can be used. This information, for example, can be the fact that the first point and the second point have the same distance to a plane encompassing the reference object or the reference surface (thus a line leading through the first point and the second point is parallel to this plane). Another example of such information is a relationship between the spatial position of the reference object in the first picture and the spatial position of the reference object in the second picture. This can be the information that the spatial position of the reference object relative to the first point and to the second point in the first picture is the same as in the second picture. Or that the reference object in the second picture is arranged in a spatial position perpendicularly to a spatial position of the reference object in the first picture.

A further advantage of the method is the fact that the method on the one hand can be applied generally, but on the other hand is still simple to implement. For example, a distance between a visible first point and a non-visible point can also be measured by way of a second point lying in the same plane with the non-visible point being used for measuring the distance, depending on the embodiment variant of the method. Thereby, these methods are still simple to implement, depending on the respective embodiment variant.

A simple implementation of the method, for example, can mean that the method is based on few and simple computation operations. Simple implementation of the method can also mean that, for example, one can partly or completely make do without a reconstruction of an object to be measured, in three-dimensional space. In particular, one can even partly or completely make do without a reconstruction of the spatial position of the first point and second point in three-dimensional space. This permits a comprehensive application of the method and places low demands on a device applying the method. The method can thus be applied with simple means and devices.

As an optional feature in the method mentioned above, a line running through the first point and the second point in the first picture either intersects a plane, in which a surface of the reference object with a known dimension lies, or the line is arranged distanced parallel to this plane. Thereby, the line also in the second picture either intersects the plane, in which the surface of the reference object with a known dimension lies, or the straight line is arranged distanced parallel to this plane.

In other words, a line running through the first point and through the second point optionally lies outside a plane, in which the surface of the reference object with a known dimension lies. The method even under these conditions permits a correct determining of the distance between the first point and the second point and can be applied and used in a versatile manner by way of this, as already described further above. This is advantageous compared to the state of the art, in which the first point, the second point and the surface of the reference object (or the reference object itself) necessarily need to lie in a common plane, in order to avoid systematic measurement errors.

Alternatively, the straight line that runs through the first point and through the second point can also be encompassed by the plane, in which the surface of the reference object with a known dimension lies.

A connection line between the first point and the second point can run at least partly through an object, as a further optional feature.

Expressed differently, the first point and the second point can be arranged in a manner such that at least a part of the connection line between the first point and the second point runs through an object. Thus, an object at least partly can lie between the first point and the second point. The first point and/or the second point can thereby lie on or in an object or be arranged next to an object. Thereby, the connection line between the first point and the second point runs at least through one object.

This has the advantage that even distances between spatially complicatedly arranged and/or difficultly accessible measurement points can be measured. One example of this is the case of the door lock as described above.

The straight line running between the first point and the second point can also be free of an intersection point with an object, as an alternative.

Optionally, the method can include the following step: moving a recording device from the first viewing point to the second viewing point and specifically after the recording of the first picture by the recording device from the first viewing point, and before the recording of the second picture by the recording device from the second viewing point.

Expressed differently, the recording of the first picture and the recording of the second picture are effected with the same recording device. Thereby, the recording device is moved between the first viewing point and the second viewing point for taking the first picture and taking the second picture.

This has the advantage that only a single recording device, which in each case takes only a single picture from a single perspective, is necessary for taking the first picture and for taking the second picture. Thus, a relatively simple recording device is sufficient for determining the distance between two measurement points, which renders the method able to be applied in a versatile, simple and/or inexpensive manner.

In contrast however, it is also possible for the recording of the first picture and the recording of the second picture to be effected by different recording devices. Or, however, for example, by a recording device that can take two pictures from two different viewing points without being moved (for example, by way of two different optical light guides or two different recording mechanisms in one recording device).

In particular, the recording of the first picture and of the second picture can be effected by way of a recording device including a 3D camera. The recording to the pictures can thereby be effected at the same time and/or in a staggered manner.

The method can however also include another optional step, specifically: displaying a current picture of the recording device by way of a display device, wherein the displaying takes place during an aligning time period before the recording of the first picture and during the aligning time period before the recording of the second picture.

Thereby, the picture (i.e. the section of a view) displayed in the display device becomes the picture, if the recording is effected by the recording device. The display device is a means for the optical representation of the picture. The aligning time period can thereby constitute a fixed time period. The aligning time period can thereby also be temporally unlimited, and began and/or terminated manually and/or automatically. For example, the aligning time period can automatically begin with an activation of the recording device and automatically finish with the recording. The aligning time period, for example, can however also be 3 seconds long. The aligning time period in particular lasts 5 seconds. The aligning time period can, however, also last 10 seconds.

The advantage of a display of the picture before the recording lies in the fact that the picture can be selected and changed in a targeted manner. This can simplify and/or accelerate the recording of the pictures, and the quality of the recordings can also be improved.

In one variant of the method, the recording device can record several pictures in series. For example, the recording device can also record a film, thus a series of pictures following one another in quick succession. Thereby, a display of the picture in the display device can help to align the recording device and take matching/suitable pictures. A suitable first picture and a suitable second picture are then determined from a plurality of pictures.

However, it is also possible not for the picture to be displayed, but only a part thereof, more than the picture, something different or nothing at all. A display device does not need to be present.

As a further feature, the method can include the following step: manually aligning the reference object in the current picture during the aligning time period by way of an aligning aid, before recording the first picture, and by way of this, a predefined positioning of the reference object in the first picture, wherein the display device displays the aligning aid and the reference object.

The method, additionally to the previously mentioned step or also instead of the previously mentioned step can include the step, which is analogous to this, for the second picture: manually aligning the reference object in the current picture during the aligning time period by way of an aligning aid, before the recording of the second picture, and by way of this, predefined positioning of the reference object in the second picture, wherein the display device displays the aligning aid and the reference object.

An aligning aid can simplify an aligning and positioning of the reference in the recorded picture. This can accelerate the method and/or improve the accuracy of the determining of the distance.

The aligning aid for example can include aligning points that display a minimum size, a maximum size and/or a certain positioning. For example, an aligning point in the display device can correspond to a defined point of the reference object, which in the display device are to be arranged over one another. For example, aligning points can mark corners of a rectangle, to which a rectangle of the reference object is to correspond. Also aligning lines, aligning outlines (contours), aligning symbols such as crosses, arrows or corner symbols and other display possibilities can be used as an aligning aid. Differences in colours, brightness or other parameters of the display device can be used as an aligning aid.

The display device, independently of the aligning aid or in combination with the aligning aid, for example, can represent parts of the displayed picture in an enlarged manner. Such a magnification function can simplify and/or accelerate an alignment and positioning of the reference object. The method can, however, also be applied without an aligning aid.

As a further option, additional information is stored on recording the first picture, between the recording of the first picture and the recording of the second picture and/or on recording the second picture, and this information is used on determining the distance between the first point and the second point.

Information can be taken, for instance, from one or more sensors, for example movement sensors, position sensors, magnetic field sensors, light sensors and proximity sensors or, for instance, GPS receivers. A tilt sensor, for example, can provide information on an inclination of a recording device and inasmuch as this is concerned on its picture. Alternatively or additionally to this, an acceleration sensor can provide acceleration values of the recording device on recording pictures for instance, and/or in particular also between the recording of pictures, which for example permits conclusions with regard to a change of the spatial position of the recording device between the recordings of pictures. Proximity sensors can also provide usable information. A storage and evaluation of this information can render the determining of the distance between the first and second point more rapid and/or simple. The method, however, can also be carried out without the additional information, which is described above.

Optionally, the method can include another step, specifically: manually identifying the reference object by an identification aid in the display device.

The manual identification can thereby be effected on recording the first and/or the second picture. The manual identification, however, can also be effected after recording the first and/or second picture.

A manual identification of the reference object by an identification aid can simplify the determining of the distance between the spatial points, accelerate this or render it more precise. One can make do without an automatic identification by way of manual identification of the reference object, for example by way of an identification of certain points of the reference object, and thus can render the method robust, quick and precise. The method by way of this can moreover be carried out with simple devices that meet simple technical demands.

The identification aid can thereby be designed similarly to the aligning aid. Or the aligning aid can be used directly as an identification aid, by way of assuming that the reference object is positioned in the picture as desired while using the alignment aid, on recording the picture. The aligning aid can, however, also be used as an identification aid in a later step. The method, however, can also be carried out without an identification aid.

The method can also include the following step: automatic identification of the reference object by way of picture recognition of straight lines.

The automatic identification can thereby be effected on recording the first and/or the second picture. The automatic identification, however, can also be effected after recording the first and/or second picture.

An automatic identification of the reference object and/or a reference surface of the reference object permits an operator-friendly design of the method.

Thereby, a picture recognition of straight lines is quick, efficient and not prone to failure. This renders an automatic identification robust, simple and quick.

The automatic identification can also be effected in other ways, for example via the recognition of geometric patterns which are designed differently to straight lines. Or via the recognition of differences and/or regularities of other picture data parameters such as color or brightness for instance. One can also completely make do without an automatic identification of the reference object.

The method as further optional step can include the following step: manually identifying the first point by way of an identification aid in the display device.

The method can also include the following step independently of the above mentioned step or in combination with it: manually identifying the second point by way of an identification aid in the display device.

The manual identification with the two above-mentioned optional steps can be effected on recording the first and/or the second picture. The manual identification can, however, also be effected after the recording of the first and/or second picture.

The advantages of a manual identification of the first point and/or the second point are the same as the advantages of the manual identification of the reference object, which are mentioned above. The identification aid for the first point and/or for the second point can thereby be designed similarly to or the same as the already described identification aid for the reference object. The method, however, can also be applied without a manual identification of the first point and/or the second point.

The reference object thereby can be designed as an object with standardised dimensions of a credit card.

The reference object can be any object. In particular, it can be any object with standardised dimensions and optionally additional with a standardised shape. The reference object in particular can be an object or articles with the dimensions of a credit card, such as a bank card, credit card, debit card, driving license, ID card, telephone card, business card, insurance card or likewise, for example. The standardised dimensions of the credit card thereby correspond to the international standard ISO/IEC 7810 of the format ID-1. The ID-1 format corresponds to a rectangle with the side lengths of 85.60 and 53.98 mm.

The use of a reference object which has the standardised dimensions of a credit card permits a simple, general and rapid application of the method, since a corresponding reference object is very widespread and easy to get. Moreover, it is very robust and is indeed available in the exactly standardised dimensions due to the worldwide proliferation of credit cards and devices used with them. Thus, one can make do without specially procured and/or specially created reference objects, which renders the method favourable and generally applicable.

An object of a different standard can alternatively also be used as a reference product, for example a sheet of the standard DIN A5 or a postcard of the standard DIN A6. It is also possible, however, to use an individually manufactured object as a reference object. A specifically printed pattern such as a checkerboard cube pattern, for example.

The method can moreover include the following step: manually aligning the first point and the reference object relative to one another, before the recording of the first picture, and by way of this, a predefined positioning of the first point and of the reference object relative to one another in the first picture.

Expressed differently, a first picture, in which the first point in the first picture is arranged in a defined position to the reference surface results from the defined alignment of the first point relative to the reference object on recording. The first point in the first picture for instance can be positioned at a left upper corner of a credit card.

Thus, the reference object can be used as an identification aid for the first point, with all the advantages that have already been described. Thereby, one can make do without an identification aid for the first point, on the display device, which renders the method simple robust and inexpensive. One can, however, also make do without such an alignment relative to the reference object.

A step that is analogous to the above-mentioned step can additionally or instead of this also be effected for the second point: manually aligning the second point and the reference object relative to one another before the recording of the second picture and by way of this, predefined positioning of the second point and of the reference object relative to one another in the second picture. The same variants and advantages apply for this.

The method, for example, can also include the following step: wiggle-free triggering of a signal for recording the first picture.

The method additionally or instead of the above-mentioned step can include a step that is analogous to this, for the second picture: wiggle-free triggering of a signal for recording the second picture.

Triggering a wiggle-free signal for recording the picture permits the picture to be recorded with a good quality. Wiggle-free thereby means that manual shaking or movements of the recording device during the recording are prevented or avoided. A wiggle-free triggering, for example, can be effected by remote controls, acoustic signals, self-triggering at a certain point in time or triggering under certain criteria (for example, with a successful automatic identification of the reference object or fulfilled conditions of an aligning aid).

The triggering of the signal for recording the picture can, however, also be effected by mechanisms or via ways that move or shake the recording device.

As a further option, the method can include the following steps:

providing a picture that includes a third point and the reference point, wherein the third point is arranged outside a line running through the first point and the second point, and determining an intersection point of the line running through the first point and through the second point with a line that is perpendicular thereto and that runs through the third point.

The third point is a further measurement point and a further spatial point as the first point and the second point. The picture that is provided can thereby be a third picture, or however the first or the second picture, as long as it encompasses the third point. With the above optional steps, the method can determine a point that is the intersection point between the connection line between the first point and the second point as well as a line that is perpendicular to this connection line and runs through the third point. This intersection point corresponds to a projection of the third point onto the connection line. If the intersection point is determined, then the distance between the first point and the intersection point can be determined and/or the distance between the second point and the intersection point can be determined.

Such a method has the advantage, for example, that a distance to a non-visible spatial point, for example, to the intersection point, can be determined, as long as a further point (here the third point) is known. The third point in this example is arranged on a perpendicular to the connection line between the first point and the second point.

With the example of a door lock, which is described further above, thus the characteristic dimensions of a lock cylinder can be simply determined by way of the first point and the second point being selected on opposite armatures of the door lock. Additionally thereby, the non-visible position of the forend screw in the lock cylinder (thus an intersection point between the forend screw and the lock cylinder) is determined by way of the third point being selected on the head of the forend screw or the opening which is provided for this. The forend screw thereby is always arranged perpendicularly to the closure cylinder.

In particular thereby, the backset can yet also be determined if the third point is arranged on the head of the forend screw (thus on the face side of the door) and the first point or the second point is arranged on the middle axis of the lock cylinder or the middle axis of an opening in the armatures of the door lock, the opening receiving the lock cylinder (or on a plane that is parallel to the face side of the door and encompasses the middle axis of the lock cylinder). The backset can, however, also be determined by a separate measurement, in particular also by way of the use of one of the methods described here.

The method, however, can also be applied with a third point that is arranged on the connection line between the first point and the second point. The method, however, can also be applied completely without a third point.

In one option, the first point and the second point can be arranged on opposite outer sides of armatures of a door lock, which is installed in a door, in the method.

As an option, which is additional to the option mentioned above; the method can include the following steps:

providing a picture that includes a third point and the reference object, wherein the third point is arranged in a forend screw middle plane and wherein the forend screw middle plane is arranged parallel to a door side perpendicular to the face side of the door and encompasses a middle axis of the forend screw and determining a distance either between the first point and/or the second point, as well as the forend screw middle plane.

The two options mentioned above relate to the example mentioned further above, of the characteristic dimensions of the lock cylinder of a door lock, and this being once only the distance between outer sides of armatures without determining the respective distance to the forend screw and once on the determining of the respective distance to the forend screw.

Several advantages of the method come to view with the example of the characteristic dimensions of the lock cylinder: the distance to a non-visible point can be determined, specifically from the first point to the forend screw middle plane and/or from the second point to the forend screw middle plane (thus, the position of the intersection point of the forend screw and lock cylinder). Moreover, the distance between the first point and the second point can be determined (thus, the distance between the outer sides of the armatures of the door), although the first point and the second point are separated by an object protruding therebetween (specifically the door) and a fastening and aligning of the reference object in the same plane as the first point and the second point is impractical, difficult and cumbersome.

Optionally, the method includes the following step:

retaining a spatial position of the reference object relative to the first point and relative to the second point during the recording of the first picture until after the recording of the second picture.

This step has the advantage that the reference object only has to be spatially positioned once, and as the case may be, also only fixed once. Moreover, the reference object after a one-off spatial positioning remains in this spatial position. Thus, the same spatial arrangement between the reference object, the first point and the second point is imaged on the first picture and the second picture. Due to this fact representing additional information, the distance between the first point and the second point can be determined from the fact that in the first picture, only the relative position of the first point to the reference object, and in the second picture, only the relative position of the second point to the reference object need to be determined. The relative positions of the first point and the second point to the reference object in the pictures can be brought into relation to one another and, thus, the distance between the first point and the second point can be determined in a quick and simple manner via the additional information that the reference object has retained its spatial position relative to the first point and relative to the second point.

A further advantage of the retention of the spatial position of the reference object relative to the first point and relative to the second point during and between the recording of the first and the second picture is the possibility of quickly and simply recording a series of consecutive pictures and making a certain selection for the first and for the second picture from these. Moreover, the recording of one or both pictures can be simply repeated. The whole method can also be repeated. The retention of the spatial position of the reference object thus simplifies and makes more easy a reproducibility of the first picture, the second picture and/or of the complete method.

Alternative, the method can also, however, have the following step:

repositioning the reference object between the recording of the first picture and the recording of the second picture, wherein the reference object is repositioned into a spatial end position, in which the reference object is located on recording the second picture, and wherein the spatial end position of the reference object is located in a certain spatial arrangement to the spatial position of the reference object on recording the first picture.

Such a repositioning of the reference object changes its spatial relative position to the first point and to the second point between the first picture and the second picture. Additional information results since this repositioning however results in a certain change of the spatial position and thus the spatial positions of the reference object in the first picture and in the second picture are connected to one another in this manner. The spatial relative positions of the first point and the second point to the reference object can be brought into a relation to one another and thus the distance between the first point and the second point can be determined via this additional information as to how the spatial position of the reference object in the first picture is linked to the spatial position of the reference object in the second picture.

The advantage of the repositioning lies in the fact that in some cases, the method for determining the distance between the first point and the second point can be applied with a high accuracy, simple computations and/or with few steps on account of a predefined and suitable specific change of the spatial position between the recording of the first picture and the recording of the second picture. The repositioning, however, can also simplify the method by way of an identification of the first point, the second point and/or of other relevant points being effected by the repositioning, and this identification, in the first picture as well as in the second picture providing additional information for determining the distance between the first point and the second point.

As a further option, the method can include the following steps:

arranging the reference object in a spatial position, in which a plane reference surface of the reference object is arranged distanced parallel to the connection line between the first point and the second point, and wherein this arrangement is effected before recording the first picture, determining the distance between the first point and the second point from picture data of the first picture and picture data of the second picture, while using a known dimension of the plane reference surface of the reference object.

Additional information is contained in the first picture, specifically an equal distance from the first point and from the second point to a plane, in which the plane reference surface lies, due to the distanced, parallel arrangement of the connection line between the first point and the second point to the plane reference surface of the reference object. This simplifies a determining of the distance between the first point and the second point, since computation steps are simplified or are done away with thanks to this additional information. For example, the distance between the first point and or the second point to the plane, in which the plane reference surface lies must only be measured once.

The described optional features of the method can be combined with one another in all technically possible combinations.

A first specific embodiment variant of the method for determining the distance between two spatial points, thus between the first point and the second point, includes the following steps:

providing a reference surface of known dimensions relative to the first point and relative to the second point in any spatial position, retaining the spatial position of the reference surface during and between all following steps that include a recording of pictures, recording a first first-point-picture from a first first-viewing-point, including the first point and the reference surface, recording a first second-point-picture from a first second-viewing-point, including the second point and the reference surface, providing a second first-point-picture from a second first-viewing-point, including the first point and the reference surface, wherein the second first-viewing-point is different to the first first-viewing-point, providing a second second-point-picture from a second second-viewing-point, including the second point and the reference surface, wherein the second second-viewing-point is different to the first second-viewing-point, determining the spatial position of the first point relative to the reference surface by way of evaluating the dimension of the reference surface of the first first-point-picture as well as by comparing the position of the first point in the first first-point-picture with the position of the first point in the second first-point-picture, determining the spatial position of the second point relative to the reference surface by way of evaluating the dimension of the reference surface of the first second-point-picture as well as by comparing the position of the second point in the first second-point-picture with the position of the second point in the second second-point-picture, determining the distance between the first point and the second point by way of comparing the spatial position of the first point relative to the reference surface with the spatial position of the second point relative to the reference surface.

A provision of the reference object can be effected, for example, by way of arranging a movable reference object. Or the provision of the reference surface is effected for example by way of a suitable selection of a suitable reference surface that is already present on an object.

A provision of a picture, for example, can be effected by a recording of a picture or by making available an already present picture.

This first specific embodiment variant permits the determining of the distance between the first point and the second point in a general case, in which the reference surface can be spatially arranged randomly relative to the first point and to the second point. This first specific embodiment variant is also called a virtual ruler with depth correction.

The pictures indicated by first-point-picture and second-point-picture do not need to be different to one another. The first first-point-picture for example can be identical to the second second-point-picture. The second first-point-picture can be identical to the first second-point-picture independently thereof or additionally thereto.

For example, apart from the reference surface and the first point, the second point can also simultaneously be encompassed by the first first-point-picture and thus also be used as a second second-point-picture. The first first-point-picture and the second second-point-picture are identical in this case. Thus, the first specific embodiment can be carried out with four different pictures, with three different pictures or with two different pictures.

The spatial position of the first point relative to the reference surface can be determined by evaluation of the parallax between the first first-point-picture and the second first-point-picture, and the spatial position of the second point relative to the reference surface can be determined by way of evaluation of the parallax between the first second-point-picture and the second second-point-picture.

The change of the position of a point from a first picture to a second picture when the viewing point of the recording device changes between the first picture and the second picture is indicated as parallax.

This first specific embodiment is very broadly applicable and necessitates a depth correction. This depth correction is thus a correction for any distances of the first point and the second point to a plane encompassing the reference surface. An evaluation of these distances is necessary due to this, which can usefully be effected via the evaluation of the parallax. The determining of these distances corresponds to a determining of the spatial position of the first point or second point with respect to the reference surface. This is simple to carry out and simple to implement in comparison to a complete three-dimensional reconstruction of unknown measurement points.

A second specific embodiment variant of the method for determining a distance between two spatial points, thus between a first point and a second point, includes the following steps:

providing a plane reference surface of known dimensions in a spatial position distanced parallel to a connection line of the first point and second point, retaining the spatial position of the reference surface during and between all subsequent steps that include a recording of pictures, recording a first first-point-picture from a first first-viewing-point, including the first point and the reference surface, recording a first second-point-picture from a first second-viewing-point, including the second point and the reference surface, providing a second first-point-picture from a second first-viewing-point, including the first point and the reference surface, wherein the second first-viewing-point is different to the first first-viewing-point, providing a second second-point-picture from a second second-viewing-point, including the second point and the reference surface, wherein the second second-viewing-point is different to the first second-viewing-point, determining the spatial position of the first first-viewing-point relative to the reference surface by way of evaluating the dimension of the reference surface of the first first-point-picture, determining the spatial position of the first second-viewing-point relative to the reference surface by way of evaluating the dimension of the reference surface of the first second-point-picture, determining a first-viewing-point correction value by way of comparing the position of the first point in the first first-point-picture with the position of the first point in the second first-point-picture, determining a second-viewing-point correction value by way of comparing the position of the second point in the first second-point-picture with the position of the second point in the second second-point-picture, determining the distance between the first point and the second point by way of combination of the spatial position of the first first-viewing-point, of the spatial position of the first second-viewing-point as well as of the first-viewing-point correction value and of the second-viewing-point correction value.

This second specific embodiment variant permits the determining of the distance between the first point and the second point for a specific case, in which the reference surface is arranged spatially distanced parallel to the connection line of the first point and the second point. This second specific embodiment variant is also indicated as a virtual ruler.

In this second specific embodiment variant too, the pictures indicated as the first-point-picture and the second-point-picture analogously to the first specific embodiment variant do not need to be different to one another. The first first-point-picture can thus be identical to the second second-point-picture. Independently of this or additionally thereto, the second first-point-picture can be identical to the first second-point-picture. Thus, this second specific embodiment variant can also be carried out with four different pictures, with three different pictures or with two different pictures.

The spatial position of the first first-viewing-point relative to the reference surface can be determined by evaluating the dimensions of the reference surface. And the spatial position of the first second-viewing-point relative to the reference surface can be determined by way of evaluating the dimensions of the reference surface.

Moreover, the first-viewing-point correction value can be determined by way of evaluating the parallax between the first first-point-picture and the second first-point-picture. The first-viewing-point correction value, for example, can include a deviation of the first-viewing-point from a perpendicular to the plane reference surface, the perpendicular running through the first point. Analogously, the second-viewing-point correction value can be determined by way of evaluating the parallax between the first second-point-picture and the second second-point-picture. The second-viewing-point correction value can then, for example, include a deviation of the second-viewing-point from a perpendicular to the plane reference surface, the perpendicular running through the second point.

The distance between the perpendicular to the reference surface and which runs through the first point and the perpendicular to the reference surface and which runs through the second point thereby corresponds to the distance between the first point and the second point (the distance can be determined without depth correction since the connection line between the first point and second point runs parallel to the reference surface).

Thus, for example, as described above, the distance between the first point and the second point can be determined via the perpendiculars to the reference surface and running through the first point and the second point, by way of the combination of the spatial position of the first-viewing-point, the spatial position of the second-viewing-point, the first-viewing-point correction value and the second-viewing-point correction value. The spatial position of the measurement points, thus the spatial position of the first point and second point are not reconstructed at all in this case.

This second specific embodiment variant can be compared to a virtual ruler, on which the viewing points are distributed. If the virtual ruler is aligned parallel to the connection line of the first point and second point, and the viewing points each correspond to a projection of the first point and the second point onto the ruler, then a distance between the viewing points corresponds to the distance between the first point and the second point.

This for a simpler symbolic representation can be rewritten as follows: the distance between the first point and the second point can be measured by eye, if only one eye is opened and the connection line of the first point and the second point is arranged parallel to a plane. If the eye on a first perpendicular to this plane views the first point, and the eye changes its spatial position along a line parallel to this plane in a manner such that on a second perpendicular to this plane it views the second point, then this spatial position change corresponds to a change of the position by a distance that corresponds to the distance of the first perpendicular to the second perpendicular and finally also to the distance between the first point and the second point. If a transparent ruler thereby lies in this plane, the distance between the viewing points of the eye can be measured by way of corresponding projections of the first point and second point (or intersections with the respective perpendiculars) on a scale of the ruler. For this reason, the term virtual ruler relates to the second specific embodiment variant since a method analogous to the above symbolic representation or allegory can be carried out with it.

The second specific embodiment variant simply expressed simulates a viewing manner of the measurement points that is perpendicular to the reference surface. Coordinates of the viewing point are corrected by the viewing point correction value in a manner such that a line running through the viewing point and the measurement point is perpendicular to the reference surface. Expressed differently, the second specific embodiment variant can be understood as a projection of the measuring point onto a projection plane arranged parallel to the reference surface. The determining of a distance in three-dimensional space in this projection plane simplifies to determining a distance in a two dimension surface. This is simple and quick to compute.

The second specific embodiment variant has analogous advantages as the method of the above-described measurement by eye and is, thus, a simple and efficient method for measuring the distance between the first point and the second point. Thereby, the above-described measurement by eye also has disadvantages since a series of constraints must be adhered to, in order to permit an accurate determining of the distance. The constraints already described above specifically are: parallel arrangement of the ruler in a plane, movement of the eye parallel to the plane and, thus, parallel to the connection line, and viewing direction of the eye onto a perpendicular to the plane.

The second specific embodiment variant has the advantage that it is in the position of compensating or correcting inaccuracies or deviations from the described constraints for the measurement. An accurate determining of the distance between the first point and the second point can be carried out even with pictures not fulfilling the constraints due to the use of the reference surface for determining the viewing points and due to the evaluation of one picture pair per measurement point (thus evaluation of two pictures including the first point and the reference surface and of two pictures including the first point and the reference surface). The viewing points of the pictures can therefore be selected freely of the mentioned constraints, and this permits a broad and simple application of the method.

With the application of the second specific embodiment to the above-described case of a door lock, it is thereby possible, apart from the characteristic dimensions of the lock cylinder, to yet also determine the backset. For instance, the reference can be arranged on the face side of the door for this, and the first point or the second point can be arranged in a plane that is arranged parallel to the face side of the door and which comprises the middle axis of the lock cylinder. The depth of the first point or of the second point (thus the distance to the reference surface) and which can be determined by evaluating the parallax then corresponds to the backset.

A third specific embodiment variant of the method for determining a distance between two spatial points, thus between a first point and a second point, includes the following steps:

arranging a reference surface of known dimensions in a first reference plane, wherein the first reference plane is arranged distanced parallel to a connection line of the first point and second point, recording a first picture from a first viewing point, wherein the first picture includes the first point, the second point and the reference surface, arranging the reference surface in a second reference plane that is arranged perpendicularly to the first reference plane and runs essentially through the first point, recording a second picture from a second viewing point, wherein the second picture includes the first point, the reference surface and two intersection points between the first and the second reference plane, determining a distance of the first point to the first reference plane by way of evaluating the dimension of the reference surface in the second picture as well as a position of the first point relative to the two intersection points between the first and the second reference plane in the second picture, determining the distance between the first point and the second point by way of a combination of an evaluation of the dimension of the reference surface in the first picture as well as of a position of the first point and a position of the second point in the first picture and of the distance of the first point to the first reference plane.

This third specific embodiment variant permits the determining of the distance between the first point and the second point for a specific case, in which a first reference plane is arranged spatially distanced parallel to the connection line of the first point and second point. Thereby, a second reference plane that runs essentially through the first point, is arranged perpendicularly to the first reference plane. "Essentially" thereby means that the first point is distanced to the second reference surface by only maximally 5%, in particular maximally 3% and in particular maximally 1% of the distance between the first point and the second viewing point.

The reference surface is arranged in the first picture in the first reference plane, and in the second picture in the second reference plane. The reference surface in this case is designed in a movable manner. The first picture thereby includes the first point and the second point as well as the reference surface. The second picture includes the first point and the reference surface as well as two intersection points between the first reference plane and the second reference plane, which permits the determining of the distance of the first point to the second reference plane. This distance is identical to the distance of the second point to the second reference plane. The distance between the first point and the second point can be determined from a combination of this distance with picture data from the first picture. This third specific embodiment variant is indicated as a double view.

The double view in particular is suitable for parts of structures or objects that are arranged at right angles and/or parallel to one another. The double view permits a rapid and simple computation of the distance between the first point and second point, since a fulfillment of the above-mentioned preconditions creates a clear spatial relation between the spatial position of the reference surface in the first picture and the spatial position of the reference surface in the second picture. A necessary depth correction of the first point and of the second point in the first picture is rendered possible by way of a distance measurement of the first point in the second picture.

The last step of the third specific embodiment, thus the determining of the distance between the first point and the second point is effected, for example, by way of determining the spatial position of the first viewing point relative to the reference surface by way of the evaluation of the dimensions of the reference surface. Moreover, a determining of the spatial position of the first point and of the second point is effected on account of the information that these are located in a parallel plane to the reference plane. The distance of the parallel plane to the reference plane corresponds to the distance of the first point to the first reference plane, the distance being determined in the preceding method step. Two spatially unambiguously definably arranged lines, on which the first point or the second point lie result from the picture data of the first point and of the second point in the first picture and the spatial position of the first viewing point. This spatial position of both lines in combination with the parallel plane, whose spatial position is likewise known results in exactly two intersection points, and specifically the first point and the second point. The spatial position of these intersection points is thereby known, and the distance between the first point and the second point can be determined therefrom.

With the application of the third specific embodiment to the above-described case of a door lock, it is thereby possible, apart from the characteristics dimensions of the lock cylinder, to yet determine the backset. For this, the first reference plane for instance can encompass the face side of the door, and the second reference plane can encompass a side of the door that is perpendicular to the face side. Thus, the door edge between the above-mentioned side of the door and the face-side of the door is the intersection edge of the first and second reference plane. Moreover, if the first point is yet arranged in a plane that is arranged parallel to the face side of the door and that includes the middle axis of the lock cylinder, then the distance from the first point to the door edge then corresponds to the backset. Or the backset however can be determined by way of a new measurement point such as a fourth point, for example, being determined in the second picture, wherein the second reference plane runs essentially through the fourth point. Moreover, the fourth point must lie in a plane arranged parallel to the face side of the door, wherein the plane includes the middle axis of the lock cylinder. In this case too, the backset can be determined and this corresponds to the distance of the fourth point to the door edge.

The invention includes a computer program that has software means for determining the distance between the first point and the second point according to one of the methods described above.

Moreover, the invention includes an electronic apparatus with the above-mentioned computer program and the above-mentioned software means.

The apparatus includes memory means with computer program code means or software means, which are stored therein and which describe a computer program, and a data processing means (such as, for example, a processor) for carrying out the computer program, wherein the implementation of the computer program leads to the method being carried out for determining a distance.

The computer program for determining a distance can be loaded into an internal memory of a digital data processing unit and includes computer program code means, which when they are carried out in a digital data processing unit, bring this to implement the method for determining a distance. In one embodiment of the invention, a computer program product includes a data carrier or a computer-readable medium, on which the computer program code means are stored.

The invention also includes an electronic apparatus for determining the distance between the first point and the second point according to one of the methods described above, wherein the electronic apparatus includes a recording device for recording the first and the second picture, a picture display module for displaying a current section of a view of the recording device and a computation unit as a data processing means, for determining the distance between the first point and second point.

Thereby, the features of the method claims analogously can be combined with the devices claims and vice versa.

BRIEF DESCRIPTION OF THE DRAWINGS

The subject matter of the invention is explained hereinafter in more detail by way of preferred embodiment examples, which are represented in the accompanying drawings. In each case are schematically shown in:

FIG. 1 is an illustration regarding the method according to claim 1, in a view from above;

FIG. 2 is an illustration regarding the method of FIG. 1, in a view from the front;

FIG. 3 an illustration regarding the method according to a first specific embodiment variant, in a view from above;

FIG. 4 is an illustration regarding the method of FIG. 3, from a view from the front;

FIG. 5 is an illustration of a first variant of the method of FIG. 3, in a view from above;

FIG. 6 is an illustration of a second variant of the method of FIG. 3, in a view from above;

FIG. 7 is an illustration of a method according to the second specific embodiment variant, in a view from above;

FIG. 8 is an illustration regarding the method of FIG. 7, from a view from the front;

FIG. 9 is an illustration regarding the recording of the first picture according to the method of the third specific embodiment, in a view from above;

FIG. 10 is an illustration regarding the recording of the second picture according to the method of the third specific embodiment variant, in a view from above;

FIG. 11 is a view from above on an application example regarding the method according to the second specific embodiment variant;

FIG. 12 is a view from the front, regarding the application example of FIG. 11;

FIG. 13 is a view from the front of an application example on recording the first picture according to the third specific embodiment variant;

FIG. 14 is a view from the side onto the application example of FIG. 13 on recording the second picture;

DETAILED DESCRIPTION OF THE INVENTION

Figure 15:
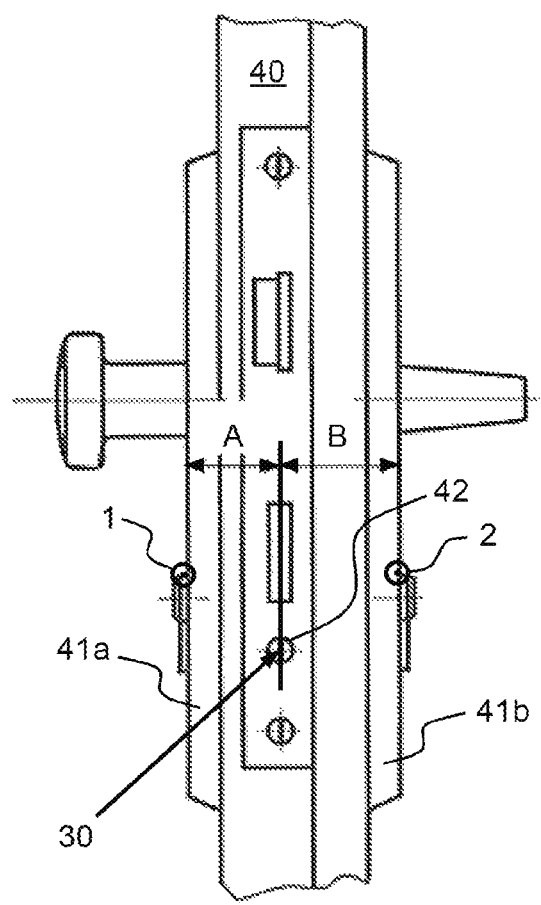
FIG. 15 is an illustration of characteristics dimensions of a lock cylinder with the example of an installed door lock.

Basically, the same parts are provided with the same reference numerals in the figures.

FIGS. 1 and 2 each show an illustration of the method according to claim 1, in FIG. 1 in a view from the top and in FIG. 2 from a view from the front. The views of all figures (thus the descriptions of a view from the front, from above or from the side) thereby relate to a position of the reference object or the reference surface in its spatial position on recording the first picture.

The first point 1 and the second point 2 are two spatial points and are each represented as circled points. The reference object 3 is a flat and plane plastic card with the standardised dimension of a credit card, for example, a debit card or a bank card. The first viewing point 5 and the second viewing point 7 are spatially separated from one another. The first viewing point 5 and the second viewing point 7 are arranged in a manner such that a plane that encompasses the reference object 3 lies between them and the first point 1 as well as the second point 2. With regard to the FIGS. 1 and 2, it is the case of schematic representations, wherein the viewing points 5, 7 are represented closer to the reference object 3 than in most applications. The same analogously applies to the other figures (for all viewing points with respect to reference objects and reference surfaces).

As is evident from FIG. 2, the first point 1 and the second point 2 in this spatial arrangement of the reference object 3 on recording a single picture from the shown view from the front cannot simultaneously be encompassed by this picture. Moreover, the first point 1 and the second point 2 do not lie in the same plane as the reference object 3. The method from the state of the art can thus not be used in this spatial arrangement of the reference object 3 and the measurement points 1, 2, in order to determine the distance between the first point 1 and the second point 2.

The method for determining a distance between the first point 1 and the second point 2 runs as follows:

recording the first picture from the first viewing point 5, wherein the first picture includes the reference object 3 and the first point 1 (only a dashed arrow from the first viewing point 5 to the first point 1 is represented for the illustration of the viewing line for the purpose of a better overview, and viewing lines to the reference object 3 are omitted and this manner of representation applies to all figures of this application), recording the second picture from the second viewing point 7, wherein the second picture includes the reference object 3 and the second point 2 and wherein the second viewing point 7 differs from the first viewing point 5, determining the distance between the first point 1 and the second point 2 from picture data of the first picture and picture data of the second picture, while using the known dimension of the reference object 3, specifically the standardised dimensions of a credit card.

In the last method step, the determining of the distance can be effected for example while using the method of the first or second specific embodiment variant and/or while using additional information.

Reference is made to the reference surface 9 in all three specific embodiment variants. Thereby, the reference surface 9 can also be encompassed by the reference object 3. The reference surface 9 for reasons of a simple representation is represented in a view from above with a thickness that, in reality, is not present, in all illustrations and application examples regarding the three specific embodiment variants. Moreover, the reference surface 9 in all illustrations and application examples of the three specific embodiment variants is designed in a plane manner and has the standardised dimensions of a credit card.

FIG. 3 shows an illustration of the method according to the first specific embodiment from a view from above, and FIG. 4 shows an illustration of the method of FIG. 3 from a view from the front. The first point 1 and the second point 2 are arranged at any distance to a plane that includes the reference surface 9. This plane is arranged between a first first-viewing-point 15, a second first-viewing-point 16, a first second-viewing-point 17 and a second second-viewing-point 18 on the one side and the first point 1 and the second point 2 on the other side. As is evident in FIGS. 3 and 4, the first first-viewing-point 15, the second first-viewing-point 16, the first second-viewing-point 17 and the second second-viewing-point 18 are spatially positioned free of any certain arrangement relative to one another, relative to the reference surface 9 or relative to the first point 1 or the second point 2.

The first specific embodiment variant of the method for determining the distance between the first point 1 and the second point 2 runs as follows:

arranging the reference surface 9 of standardised dimensions of a credit card relative to the first point 1 and relative to the second point 2 in any spatial position (thus as represented in FIGS. 3 and 4).

retaining the spatial position of the reference surface 9 during and between all following steps that include a recording of pictures.

recording a first first-point-picture from a first first-viewing-point 15, including the first point 1 and the reference surface 9, recording a first second-point-picture from a first second-viewing-point 17, including the second point 2 and the reference surface 9, providing (here by recording) a second first-point-picture from a second first-viewing-point 16, including the first point 1 and the reference surface 9, wherein the second first-viewing-point 16 is different to the first first-viewing-point 15, providing (here by recording) a second second-point-picture from a second second-viewing-point 18, including the second point 2 and the reference surface 9, wherein the second second-viewing-point 18 is different from the first second-viewing-point 17, determining the spatial position of the first point 1 relative to the reference surface 9 by way of evaluating the dimension of the reference surface 9 of the first first-point-picture as well as evaluating the parallax between the first first-point-picture and the second first-point-picture with respect to the first point 1 (thus by comparing the position of the first point 1 in the first first-point-picture with the position of the first point 1 in the second first-point-picture), determining the spatial position of the second point 2 relative to the reference surface 9 by way of evaluating the dimension of the reference surface 9 of the first second-point-picture as well as evaluating the parallax between the first second-point-picture and the second second-point-picture with respect to the second point 2 (thus, by comparing the position of the second point 2 in the first second-point-picture with the position of the second point 2 in the second second-point-picture), determining the distance between the first point 1 and the second point 2 by way of comparing the spatial position of the first point 1 relative to the reference surface 9 with the spatial position of the second point 2 relative to the reference surface (a simple coordinate computation is sufficient for this, as long as the first point 1 and the second point 2 are included in the same coordinate system—which is ensured by the reference surface 9).

In FIGS. 3 and 4, the first specific embodiment variant is represented by way of a general example, in which the first first-viewing-point 15, the second first-viewing-point 16, the first second-viewing-point 17 and the second second-viewing-point 18 are spatial points, which are different to one another. Thus four different pictures arise with the described method. The first specific embodiment variant can also be carried out in other variants, since in the represented simple example (as is clearly evident in FIG. 4), the first point 1 and the second point 2 as well as simultaneously the reference surface 9 can be encompassed by a picture from the view from the front.

FIG. 5 thereby shows an illustration of a first variation of the method of FIG. 3 in a view from above. As is evident from FIG. 5, the first first-viewing-point 15 and the second second-viewing-point 18 are identical. Thus, the first first-point-picture is identical to the second second-point-picture, and in the step providing (here by recording) a second second-point-picture from a second second-viewing-point 18, including the second point 2 and the reference surface 9 the "providing (here by recording)" can be replaced by "providing (here by making available)". Thus, one picture less needs to recorded since the already recorded second first-point-picture as well as the second second-point-picture can be used (the picture thus comprises the first point 1 and the reference surface 9 as well as the second point 2). Thus, a provision and falling back on the second first-point-picture can replace the recording of the second second-point-picture. This permits the method to be simply and rapidly carried out. Thus, it is sufficient to record only three pictures with this first variation of the method of FIG. 3.

An illustration of a second variation of the method of FIG. 3 is represented in a view from above in FIG. 6, analogously to the description of FIG. 5. In this, not only are the first first-viewing-point 15 and the second second-viewing-point 18 identical, but moreover the second first-viewing-point 16 and the first second-viewing-point 17 are identical. Thus, not only is the first first-point-picture identical to the second second-point-picture, but also the second first-point-picture is identical to the first second-point-picture. Thereby, analogously to the description of FIG. 5, not only can the recording of the second second-point-picture, but also the recording of the second first-point-picture can be replaced by making available the respective identical picture. This permits the method to be carried out in a simple and rapid manner. Thus, with this second variation of the method of FIG. 3, it is sufficient to record only two pictures.

An illustration of the method according to the second specific embodiment variant is shown in a view from above in FIG. 7, and FIG. 8 shows an illustration of the method of FIG. 7 from a view from the front. The single difference from the example shown in FIGS. 3 and 4 in comparison to the example shown in FIGS. 7 and 8 lies in the fact that a connection line between the first point 1 and the second point 2 runs parallel to the reference surface 9 in FIGS. 7 and 8. This permits the applications of the second specific embodiment variant as follows:

arranging the plane reference surface 9 of standardised dimensions of a credit card in a spatial position distanced parallel to a connection line of the first point 1 and the second point 2 (thus as represented in FIGS. 7 and 8), retaining the spatial position of the reference surface 9 during and between all following steps, which comprise a recording of pictures, recording a first first-point-picture from a first first-viewing-point 15, including the first point 1 and the reference surface 9, recording a first second-point-picture from a first second-viewing-point 17, including the second point 2 and the reference surface 9, providing (here by recording) a second first-point-picture from a second first viewing point 16, including the first point 1 and the reference surface 9, wherein the second first-viewing-point 16 is different to the first first-viewing-point 15, providing (here by recording) a second second-point-picture from a second second-viewing-point 18, including the second point 2 and the reference surface 9, wherein the second second-viewing-point 18 is different from the first second-viewing-point 17, determining the spatial position of the first first-viewing-point 15 relative to the reference surface 9 by way of evaluating the dimension of the reference surface 9 of the first first-point-picture, determining the spatial position of the first second-viewing-point 17 relative to the reference surface 9 by way of evaluating the dimension of the reference surface 9 of the first second-point-picture, determining a first-viewing-point correction value by way of comparing the position of the first point 1 in the first first-point-picture with the position of the first point 1 in the second first-point-picture, determining a second-viewing-point correction value by way of comparing the position of the second point 2 in the first second-point-picture with the position of the second point 2 in the second second-point-picture, determining the distance between the first point 1 and the second point 2 by way of combination of the spatial position of the first first-viewing-point 15, the spatial position of the first second-viewing-point 17 as well as the first-viewing-point correction value and the second-viewing-point correction value.

Analogously to the first specific embodiment variant, in the selected simple example of the method, the second specific embodiment variant can be carried out by way of recording four different pictures, or however by way of recording three pictures or recording two pictures. The "providing" thereby analogously to the first variation and to the second variation of the first specific embodiment variant can be effected by way of "making available" instead by "recording".

An illustration for recording the first picture according to the method of the third specific embodiment variant is represented in a view from above in FIG. 9. FIG. 10 shows an illustration for recording the second picture according to the method of the third specific embodiment variant in a view from above.

The third specific embodiment variant of the method for determining the distance between the first point 1 and the second point 2 can be carried out as follows:

arranging the reference surface 9 of the standardised dimensions of a credit card in a first reference plane 20, wherein the first reference plane 20 is arranged distanced parallel to the connection line of the first point 1 and the second point 2 (as is shown in FIG. 9), recording the first picture from the first viewing point 5, wherein the first picture includes the first point 1, the second point 2 and the reference surface 9, arranging the reference surface 9 in a second reference plane 21, which is arranged perpendicularly to the first reference plane 20 and essentially runs through the first point 1 (as shown in FIG. 10), recording the second picture from the second viewing point 7, wherein the second picture includes the first point 1, the reference surface 9 and two intersection points between the first reference plane 20 and the second reference plane 21, wherein the two intersection points are encompassed by the intersection line 22 between the first reference plane 20 and the second reference plane 21, determining the distance of the first point 1 to the first reference plane 20 by way of evaluating the dimension of the reference surface 9 in the second picture as well as a position of the first point 1 relative to the two intersection points between the first reference plane 20 and the second reference plane 21 in the second picture, determining the distance between the first point 1 and the second point 2 by way of a combination of an evaluation of the dimension of the reference surface 9 in the first picture as well as of a position of the first point 1 and of a position of the second point 2 in the first picture and of the distance of the first point 1 to the first reference plane 20.

A view from above on an application example for the method according to the second specific embodiment variant is represented in FIG. 11. FIG. 12 thereby shows a view from the front of the application example of FIG. 11.

In this application example, the second specific embodiment variant is used. The first specific embodiment variant however can likewise be applied. The application example is a door lock that is installed in a door 40 and which does not yet have a lock cylinder but openings in armatures 41a, 41b that are envisaged for this, and a forend screw 42. The second specific embodiment variant can be applied since a longitudinal axis of the lock cylinder or a longitudinal axis of the openings in the armatures 41*a*, 41*b* and that are envisaged for this, generally and in the present case is arranged parallel to the face side of the door 40. The face side of the door 40 is indicated as a side of the door 40 through which the door bar/latch is moved on closing the door lock.

The aim of the method is a measurement of the distance between the outer sides of the armatures 41*a*, 41*b* in a condition installed into the door 40. This is effected by way of carrying out the following steps:

arranging a credit card serving as a reference object 3, on the face side of the door 40, selection of a first point 1 on an outer side of the first armature 41*a* and selection of a second point 2 on an outer side of a second armature 41*b* lying opposite the first armature 41*b* (and by way of this, arranging the reference object 3 and a plane reference surface located thereon in a spatial position distanced parallel to a connection line of the first point 1 and the second point 2), retaining the spatial position of the reference object 3 (for example, by way of a fixation with a re-releasable adhesive tape on the face side of the door 40), and by way of this, retaining the spatial position of the reference surface during and between all following steps that include a recording of pictures, recording the first first-point-picture from the first first-viewing-point 15, including the first point 1 and the reference surface, wherein the recording is effected by a smartphone, recording a first second-point-picture from the first second-viewing-point 17, including the second point 2 and the reference surface, wherein the recording of the first second-point-picture is likewise effected with a smartphone and the smartphone as a result is moved between the first first-viewing-point 15 and the first second-viewing-point 17 for this, providing (by way of recording with the smartphone) a second first-point-picture from a second first-viewing-point 16 (by way of previous movement of the smartphone to the second first-viewing-point 16), wherein the second first-point-picture includes the first point 1 and the reference surface, and the second first-viewing-point 16 is different to the first first-viewing-point 15, providing (by way of recording with the smartphone) a second second-point-picture from a second second-viewing-point 18 (by way of previous movement of the smartphone to the second second-viewing-point 18), wherein the second second-point-picture includes the second point 2 and the reference surface, and the second second-viewing-point 18 is different to the first second-viewing-point 17, determining the spatial position of the first first-viewing-point 15 relative to the reference surface and thus to the reference object 3 by way of evaluating the dimension of the reference surface of the first first-point-picture, determining the spatial position of the first second-viewing-point 17 relative to the reference surface and thus to the reference object 3 by way of evaluating the dimension of the reference surface of the first second-point-picture, determining a first-viewing-point correction value by way of evaluating the parallax of the first first-point-picture and of the second first-point-picture with respect to the first point 1, thus by way of comparing the position of the first point 1 in the first first-point-picture with the position of the first point 1 in the second first-point-picture, determining a second-viewing-point correction value by way of evaluating the parallax of the first second-point-picture and the second second-point-picture with respect to the second point 2, thus by comparing the position of the second point 2 in the first second-point-picture with the position of the second point 2 in the second second-point-picture, determining the distance between the first point 1 and the second point 2 by way of a combination of the spatial position of the first first-viewing-point 15 relative to the reference surface, of the spatial position of the first second-viewing-point 17 relative to the reference surface as well as of the first-viewing-point correction value and of the second-viewing-point correction value.

As already specified further above, the second specific embodiment variant can thereby be effected by way of recording four different pictures. It is also possible, however, to carry out the method by way of recording three different pictures or by recording two different pictures.

The described method for measuring a distance between outer sides of armatures 41*a*, 41*b* in a condition installed in the door 40 can yet be expanded further. A third point 30 is also imaged in the FIGS. 11 and 12. The third point 30 is arranged on the face side of the forend screw 42, and specifically on the middle axis of the forend screw 42. The third point 30 lies on the face side of the door 40 and, thus, essentially in the same plane as the reference surface.

Apart from the distance between the outer sides of armatures, a position of the forend screw 42 relative thereto is of interest. A measurement of the position of the forend screw is accordingly difficult since this forend screw 42 is not well accessible between the armatures 41*a*, 41*b* and is not well visible. Added to this is the fact that although a position of the forend screw 42 can be measured, the measurement points (here e.g. the third point 30) which are suitable for this, however with the first point 1 and the second point 2 together span a plane which is not arranged parallel to the reference surface.

The determining of a distance in three-dimensional space simplifies to a determining of a distance in a two-dimensional surface (thus, the projection plane), since the second specific embodiment variant can be understood as a projection of the measurement point 1, 2, 30 onto a projection plane arranged parallel to the reference surface. One picture (which includes the third point 30 and the reference surface) is then sufficient, in order to determine a perpendicular to the projection plane and running through the third point 30, if the third point 30 is arranged essentially in the same plane as the reference surface. A projection of the third point 30 onto the projection plane can thus be carried out quickly and simply.

If the third point 30 lies outside a plane encompassing the reference surface, then a perpendicular to the reference surface and running through the third point 30 (or the viewing point and a corresponding viewing point correction) can be determined by two pictures, each including the reference surface and the third point 30, from two different viewing points, by way of evaluating the parallax. A projection of the third point 30 onto the projection plane can be carried out in this manner for a general spatial position of the third point 30.

In a special case, the projection of the third point 30 lies on the connection line of the projections of the first point 1 and the second point 2, for example by way of a suitable section of the third point 30, in which a perpendicular to the projection plane and running through the third point 30 intersects the connection line between the first point 1 and the second point 2. Therefore, in the mentioned special case, the distance between the outer sides of the armatures 41, 41*b* and the spatial position of the forend screw 42 results by way of determining the distance between the first point 1 or the second point 2 and the third point 30 in the projection plane.

In a general case, the third point 30, for example, lies on any point of a forend screw middle plane. Thereby, the forend screw middle plane is arranged parallel to a door side perpendicular to the face side of the door and encompasses the middle axis of the forend screw. The spatial position of the forend screw 42 can be deduced by the third point 30 on the forend screw middle plane, since the forend screw 42 is perpendicular to the reference surface.

If the projection of the third point 30 onto the projection plane does not lie on the line between the projections of the first point 1 and of the second point 2, as in the above-described special case, then the spatial position of the forend screw 42 corresponds to an intersection point of the line between a projection of the first point 1 and a projection of the second point 2 and a line that is perpendicular to this and that runs through the projection of the third point 30. This is two-dimensional problem that is simple to compute on account of the projections onto the projection plane. The respective distances between these points of the projection plane can likewise be determined in a simple and rapid manner Expressed differently, the third point 30 is arranged on a perpendicular to the connection line between the first point 1 and the second point 2. In the second specific embodiment variant (wherein the connection line between the first point 1 and the second point 2 is arranged parallel to the reference surface) this arrangement can be used to determine the intersection point between the connection line between the first point 1 and the second point 2 and its perpendicular running through the third point 30. The forend screw 42 is arranged on this intersection point.

A view from the front on an application example on recording a first picture according to the third specific embodiment variant is represented in FIG. 13. FIG. 14 shows a view from the side, onto the application example of FIG. 13 on recording the second picture. The application example in FIGS. 13 and 14 is the same as for the FIGS. 11 and 12, specifically the determining of the distance between outer sides of the armatures 41*a*, 41*b* installed into the door 40, wherein a credit card with corresponding reference surface is used as a reference object 3.

The third specific embodiment variant in this application example is applied as follows:

arranging the credit card serving as a reference object 3 on the face side of the door 40 and selection of the first point 1 on a first outer side of the armature 41*a* and of the second point 2 on an outer side of a second armature 41*b* lying opposite the first armature 41*a* (and, thus, arranging the reference surface of known dimensions in a first reference plane, wherein the first reference pane is arranged distanced parallel to a connection line of the first point 1 and the second point 2, as is represented in FIG. 13), recording a first picture from a first viewing point 5, wherein the first picture includes the first point 1, the second point 2 and the reference surface and wherein the recording of the first picture is effected by a smartphone, arranging the credit card serving as a reference object on a side of the door 40 that includes the armature 41*a* with the first point 1 (and by way of this, spatially arranging the reference surface in a second reference plane, which is arranged perpendicularly to the first reference plane and runs essentially through the first point, as is shown in FIG. 14), recording a second picture from a second viewing point 7, wherein the second picture comprises the first point 1, the reference surface and two points 43, 44 of a door edge on a face side of the door 40, wherein the recording of the second picture is likewise effected with a smartphone and the smartphone as a result is moved for this purpose between the first viewing point 5 and the second viewing point 7, determining the distance of the first point 1 from the first reference plane by way of evaluating the dimension of the reference surface in the second picture as well as a position of the first point 1 relative to the door edge in the second picture, i.e. relative to a lie through both points 43, 44 of the door edge, determining the distance between the first point 1 and the second point 2 by way of combination of an evaluation of the dimension of the reference surface in the first picture as well as of a position of the first point 1 and a position of the second point 2 in the first picture and of the distance of the first point 1 to the first reference plane.

The third specific embodiment can advantageously be used with the example of the distance between outer sides of the armatures 41*a*, 41*b* of the door lock installed in the door 40. The reference object 3 can be rapidly and simply repositioned into the desired spatially perpendicular position relative to the face side of the door 40, since the face side of the door 40 in most cases is aligned perpendicularly to the side of the door 40.

The characteristic dimensions of a lock cylinder, with the example of a door lock installed into a door 40, are illustrated in FIG. 15. FIG. 15 shows a door lock in a view into the face side of the door 40. The first point 1 is arranged on an outer side of the first armature 41*a* and the second point 2 on an outer side of an armature 41*b* lying opposite the first armature 41*a*. The second armature 41*b* is thereby arranged on a door inner side, thus on a side of the door 40 that faces the interior. The first armature 41 lies on a door outer side that can face an outer space or a further interior. The third point 30 is arranged on the forend screw 42. The distance A between the first point 1 and a plane that runs through the third point 30 and that runs parallel to a side of the door 40 that is perpendicular to the face side, corresponds to a first characteristic dimension of the lock cylinder. The distance B between the second point 2 and the plane that runs through the third point 30 and runs parallel to a side of the door 40 that is perpendicular to the face side, corresponds to a second characteristic dimension of the lock cylinder.

The invention claimed is:

1. A method for determining a distance between two spatial points, thus between a first point and a second point, comprising the following steps:
   recording a first picture from a first viewing point, wherein the first picture comprises a reference object and the first point, wherein the first point is arranged outside the reference object,
   recording a second picture from a second viewing point, wherein the second picture comprises the reference object and the second point and wherein the second viewing point is different than the first viewing point, and
   determining the distance between the first point and the second point by evaluating picture data of the first picture and picture data of the second picture, while using a known dimension of the reference object,
   wherein the first picture and the second picture are two-dimensional optical reproductions of reality.

2. The method according to claim 1, wherein a line running through the first point and through the second point, on the one hand in the first picture either intersects a plane, in which a surface of the reference object with the known dimension lies, or is arranged distanced parallel to this plane, as well as on the other hand in the second picture either intersects a plane, in which a surface of the reference object with a known dimension lies, or is arranged distanced parallel to this plane.

3. The method according to claim 1, wherein a connection line between the first point and the second point at least partly runs through an object.

4. The method according to claim 1, further comprising the step of: moving a recording device from the first viewing point to the second viewing point, and specifically after recording the first picture by the recording device from the first viewing point, and before recording the second picture by the recording device from the second viewing point.

5. The method according to claim 4, further comprising the step of: displaying a current picture of the recording device by way of a display device, wherein the displaying takes place during an aligning time period before the recording of the first picture and during the aligning time period before the recording of the second picture.

6. The method according to claim 5, further comprising the step of: manually aligning the reference object in the current picture during the aligning time period before the recording of the first picture, by way of an aligning aid, and by way of this, predefined positioning of the reference object in the first picture, wherein the display device displays the aligning aid and the reference object.

7. The method according to claim 4, further comprising the step of: manually identifying the reference object by way of an identification aid in a display device.

8. The method according to claim 4, further comprising the step of: manually identifying the first point by way of an identification aid in a display device.

9. The method according to claim 4, further comprising the step of: manually identifying the second point by way of an identification aid in a display device.

10. The method according to claim 1, further comprising the step of: automatically identifying the reference object by way of picture recognition of straight lines.

11. The method according to claim 1, wherein the reference object is designed as an object of standardised dimensions of a credit card.

12. The method according to claim 1, further comprising the step of: manually aligning the first point and the reference object relative to one another before the recording of the first picture, and by way of this, predefined positioning of the first point and of the reference object relative to one another in the first picture.

13. The method according to claim 1, further comprising the step of: wiggle-free triggering of a signal for recording the first picture.

14. The method according to claim 1, further comprising the steps of:
providing a picture that comprises a third point and the reference object, wherein the third point is arranged outside a line running through the first point and the second point and
determining an intersection point of the line running through the first point and through the second point with a straight line that is perpendicular to this and that runs through the third point.

15. The method according to claim 1, wherein the first point and the second point are arranged on opposite outer side of armatures of a door lock which is installed in a door.

16. The method according to claim 15, further comprising the steps of:
providing a picture that comprises a third point and the reference wherein the third point is arranged in a forend screw middle plane and wherein the forend screw middle plane is arranged parallel to a door side perpendicular to the face side of the door, and encompasses a middle axis of the forend screw, and
determining a distance between either the first point and/or the second point as well as the forend screw middle plane.

17. The method according to claim 1, further comprising the step of:
retaining a spatial position of the reference object relative to the first point and relative to the second point during the recording of the first picture until after the recording of the second picture.

18. The method according to claim 1, further comprising the step of:
repositioning the reference object between the recording of the first picture and the recording of the second picture, wherein the reference object is repositioned into a spatial end position, in which the reference object is located on recording the second picture, and wherein the spatial end position of the reference object is located in a certain spatial arrangement to the spatial position of the reference object on recording the first picture.

19. The method according to claim 1, further comprising the steps of:
arranging the reference object in a spatial position, in which a plane reference surface of the reference object is arranged distanced parallel to the connection line between the first point and the second point and wherein this arrangement is effected before the recording of the first picture,
determining the distance between the first point and the second point from picture data of the first picture and picture data of the second picture, while using a known dimension of the plane reference surface of the reference object.

20. An electronic apparatus for determining the distance between the first point and the second point according to the method of claim 1, comprising a recording device for recording the first and the second picture, a picture display module for displaying a current picture of the recording device and a processor for determining the distance between the first point and the second point.

21. A system for determining a distance between two spatial points, thus between a first point and a second point, comprising:
a memory configured to:
receive a first picture recorded from a first viewing point, wherein the first picture comprises a reference object and the first point, wherein the first point is arranged outside the reference object, and wherein the first picture is recorded as a snapshot at a point in time, and
receive a second picture recorded from a second viewing point, wherein the second picture comprises the reference object and the second point and wherein the second viewing point is different than the first viewing point, and wherein the second picture is recorded as a snapshot at a point in time, and
a processor, coupled with the memory, determining the distance between the first point and the second point from picture data of the first picture and picture data of the second picture, while using a known dimension of the reference object.

22. The system of claim 21, further comprising a recording device recording the first picture and the second picture.

* * * * *